(12) United States Patent
Takano et al.

(10) Patent No.: US 11,244,706 B2
(45) Date of Patent: *Feb. 8, 2022

(54) GLASS SPACER AND HARD DISK DRIVE APPARATUS

(71) Applicant: HOYA CORPORATION, Tokyo (JP)

(72) Inventors: Masao Takano, Akishima (JP); Shinji Eda, Hung Yen Province (VN)

(73) Assignee: HOYA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/006,733

(22) Filed: Aug. 28, 2020

(65) Prior Publication Data

US 2020/0395046 A1   Dec. 17, 2020

Related U.S. Application Data

(63) Continuation of application No. 16/634,128, filed as application No. PCT/JP2018/036747 on Oct. 1, 2018, now Pat. No. 10,783,921.

(30) Foreign Application Priority Data

Sep. 29, 2017   (JP) .............................. JP2017-191256

(51) Int. Cl.
  *G11B 17/02*   (2006.01)
  *G11B 17/038*   (2006.01)

(52) U.S. Cl.
  CPC .......... *G11B 17/021* (2013.01); *G11B 17/038* (2013.01)

(58) Field of Classification Search
  CPC ........................... G11B 17/021; G11B 17/038

USPC ...................................................... 360/98.08
  See application file for complete search history.

(56) References Cited

U.S. PATENT DOCUMENTS

| 10,783,921 B2* | 9/2020 | Takano ................ G11B 17/038 |
| 2003/0175471 A1 | 9/2003 | Kaneko |
| 2003/0179494 A1 | 9/2003 | Kaneko |
| 2008/0037163 A1* | 2/2008 | Kohei ................ G11B 17/0287 |
| | | 360/98.08 |
| 2008/0291578 A1 | 11/2008 | Ono et al. |
| 2015/0371673 A1 | 12/2015 | Tamaki et al. |

FOREIGN PATENT DOCUMENTS

| CN | 104137181 A | 11/2014 |
| CN | 105009212 A | 10/2015 |
| JP | S62-175980 A | 8/1987 |

(Continued)

OTHER PUBLICATIONS

International Search Report in PCT/JP2018/036747 dated Nov. 6, 2018.

(Continued)

*Primary Examiner* — William J Klimowicz
(74) *Attorney, Agent, or Firm* — Global IP Counselors, LLP

(57) ABSTRACT

In order to suppress the occurrence of adhesion between magnetic disks and spacers when the magnetic disks and the spacers are removed from a hard disk drive apparatus in which the magnetic disks and the spacers are installed, a surface roughness Ra of a main surface of a ring-shaped glass spacer to be arranged in contact with a magnetic disk is set to be not larger than 1.0 μm, and an average inclination RΔa of the main surface is set to be at least 0.02.

20 Claims, 2 Drawing Sheets

(56) References Cited

FOREIGN PATENT DOCUMENTS

| | | | |
|---|---|---|---|
| JP | 2001307452 | A | 11/2001 |
| JP | 2003272336 | A | 9/2003 |
| JP | 2006018922 | A | 1/2006 |
| JP | 2008090900 | A | 4/2008 |
| JP | 4136268 | B2 | 8/2008 |
| JP | 2008240946 | A | 10/2008 |
| JP | 2008293552 | A | 12/2008 |
| JP | 2010160857 | A  * | 7/2010 |

OTHER PUBLICATIONS

Office Action translated into Japanese in the corresponding Chinese Patent Application No. 201880033201.8, dated Jan. 22, 2021.

* cited by examiner

GLASS SPACER AND HARD DISK DRIVE APPARATUS

CROSS-REFERENCE TO RELATED APPLICATIONS

This is a continuation application of U.S. patent application Ser. No. 16/634,128, filed on Jan. 24, 2020, which is U.S. National stage application of International Patent Application No. PCT/JP2018/036747, filed on Oct. 1, 2018, which, in turn, claims priority to Japanese Patent Application No. 2017-191256, filed in Japan on Sep. 29, 2017, the entire contents of which are hereby incorporated herein by reference.

BACKGROUND

Field of the Invention

The present invention relates to a ring-shaped glass spacer to be arranged in contact with a magnetic disk in a magnetic recording hard disk drive apparatus, and a hard disk drive apparatus in which the glass spacer is used.

Background Information

Following the expansion of cloud computing in recent years, many hard disk drive apparatuses (hereinafter referred to as HDD apparatuses) are used in a data center for a cloud in order to increase the storage capacity. Thus, there are demands for increasing the storage capacity of HDD apparatuses, as compared with that achieved by conventional techniques.

In conventional HDD apparatuses, the recording density has been increased by reducing the float distance between a magnetic head and a magnetic disk and reducing the size of magnetic particles that are provided on magnetic disks, but these measures will reach their physical limits in coming years, and therefore the above-described demands for increasing the storage capacity of HDD apparatuses are not sufficiently satisfied. Therefore, consideration can be given to increasing the number of magnetic disks that are installed in an HDD apparatus.

Incidentally, ring-shaped spacers for magnetic disks are provided between magnetic disks installed in an HDD apparatus in order to keep the magnetic disks in a state of being spaced apart from each other. These spacers function to keep the magnetic disks from coming into contact with each other and precisely arrange the magnetic disks at predetermined positions spaced apart from each other. On the other hand, the spacers are in contact with the magnetic disks, and accordingly, if the spacers rub against the magnetic disks due to relative displacement between the spacers and the magnetic disks, for example, foreign matter, such as minute particles, may be generated by the spacers. In this case, long-term reliability of the HDD apparatus is likely to be impaired by the generated minute particles. Therefore, it is desirable to mitigate minute particles generated by the spacers.

As such a spacer, a glass spacer is known that has an average surface roughness of 0.001 to 0.005 μm in a portion (a main surface of the spacer) that comes into contact with a substrate (Japanese Patent No. 4136268).

The surface roughness of the main surfaces of the above-described spacer is small, and therefore generation of minute particles can be suppressed. However, if the surface roughness of main surfaces of a spacer is reduced, an adhesive force that acts between the spacer and a magnetic disk is increased and the following problem may occur.

Glass spacers and magnetic disks are installed in an HDD apparatus by alternately stacking the magnetic disks and the spacers with a spindle of the HDD apparatus passing through inner holes of the magnetic disks and the spacers, and then pressing the magnetic disks and the spacers in an axial direction of the spindle.

An inspection such as a performance test is performed on HDD apparatuses after installation. If a problem is found in an HDD apparatus in a performance test or the like, the stacked magnetic disks and spacers are sequentially removed from the spindle to remove a faulty magnetic disk. At this time, a spacer and a magnetic disk may be adhered to each other and unseparable from each other, because the spacers and the magnetic disks are strongly pressed in the axial direction of the spindle to come into contact with each other. Therefore, it is preferable to reduce an adhesive force between a magnetic disk and a spacer as much as possible.

In particular, if a large number of magnetic disks are installed in an HDD apparatus, a large number of spacers are also provided between the magnetic disks, and accordingly the possibility of adhesion occurring between the magnetic disks and the spacers further increases.

In recent years, the above-described problem of adhesion has become more severe, because the surface roughness of main surfaces of magnetic disks has been further reduced to increase the recording density.

SUMMARY

Therefore, an object of the present invention is to provide a glass spacer and an HDD apparatus that can suppress the occurrence of adhesion between a magnetic disk and a spacer when magnetic disks and spacers are removed from an HDD apparatus in which the magnetic disks and the spacers are installed.

One aspect of the present invention is a ring-shaped glass spacer to be arranged in contact with a magnetic disk in a hard disk drive apparatus, wherein a surface roughness Ra of a main surface of the glass spacer that comes into contact with the magnetic disk is not larger than 1.0 μm, and an average inclination RΔa of the main surface that is obtained using the following Equation (1) is at least 0.02, $$R\Delta a = \frac{1}{n}\sum_{i=1}^{n}\left|\frac{dz_i}{dX}\right| \quad (1)$$

here, $dz_i/dX$ is expressed by the following Equation (2), $\Delta X$ represents a data interval [μm] between measurement data pieces of surface roughness, and $z_i$ (i is a natural number) represents the i-th measurement data piece $$\frac{dz_i}{dX} = \frac{1}{60 \cdot \Delta X}(z_{i+3} - 9z_{i+2} + 45z_{i+1} - 45z_{i-1} + 9z_{i-2} - z_{i-3}). \quad (2)$$

It is preferable that the surface roughness Ra is not larger than 0.5 μm.

It is preferable that the surface roughness Ra is at least 0.01 μm.

It is preferable that a metal film is formed at least on the main surface of the glass spacer.

Another aspect of the present invention is a hard disk drive apparatus that includes the glass spacer and the magnetic disk.

It is preferable that, in the above-described hard disk drive apparatus, the magnetic disk includes a glass substrate and a magnetic film that is formed on the glass substrate.

It is also preferable that, in the hard disk drive apparatus, a surface roughness Ra of a main surface of the magnetic disk is not larger than 0.3 nm.

It is preferable that eight or more magnetic disks are installed in the hard disk drive apparatus.

According to the above-described glass spacer and HDD apparatus, the occurrence of adhesion between a magnetic disk and a spacer can be suppressed when magnetic disks and spacers are removed from the HDD apparatus.

DESCRIPTION OF EMBODIMENTS

The following describes a glass spacer of the present invention in detail.

Figure 1:
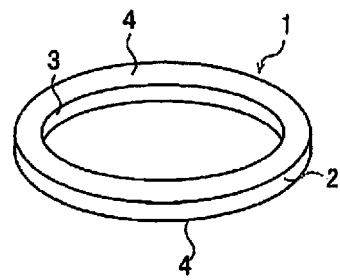
FIG. 1 is an external perspective view of a spacer for magnetic disks according to one embodiment.
Figure 2:
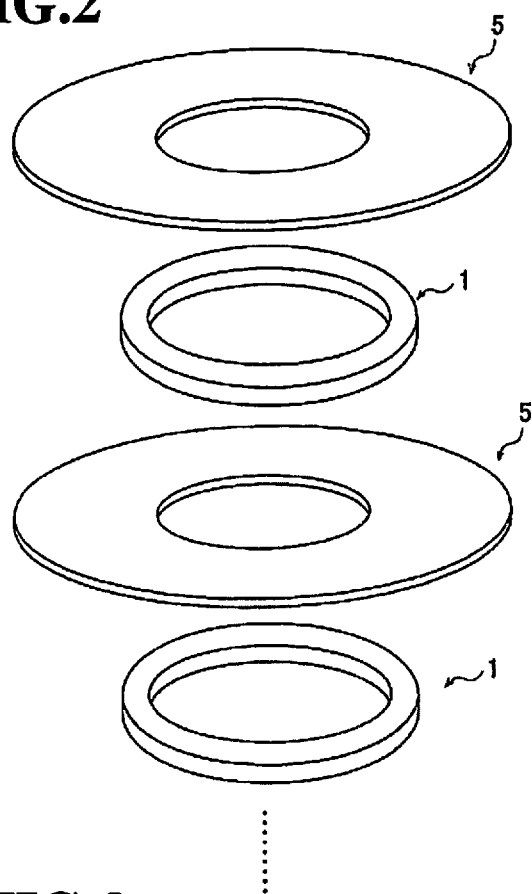
FIG. 2 is a diagram showing an arrangement of spacers according to one embodiment and magnetic disks.
Figure 3:
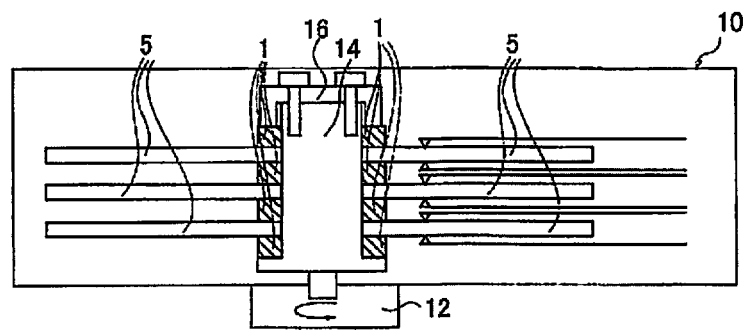
FIG. 3 is a cross-sectional view showing a main portion of an exemplary structure of an HDD apparatus in which spacers according to one embodiment are installed.

FIG. 1 is an external perspective view of a glass spacer (hereinafter simply referred to as a spacer) 1 according to one embodiment, and FIG. 2 is a diagram showing an arrangement of spacers 1 and magnetic disks 5. FIG. 3 is a cross-sectional view showing a main portion of an exemplary structure of an HDD apparatus in which the spacers 1 are installed.

The spacers 1 are installed in an HDD apparatus by alternately stacking the magnetic disks 5 and the spacers 1 on each other as shown in FIG. 2. As shown in FIG. 3, the plurality of magnetic disks 5 are fitted to a spindle 14 that is connected to a motor 12 and rotates, such that the spindle 14 passes through the magnetic disks 5 and the spacers 1 are interposed between the magnetic disks 5, and the magnetic disks 5 are fixed to the spindle 14 by being pressed from above using a screw via a top clamp 16 that is located above the magnetic disks 5, and thus the magnetic disks 5 are attached at predetermined intervals.

As shown in FIG. 2, the spacers 1 and the magnetic disks 5 are alternately arranged such that one spacer 1 is located between two magnetic disks 5, and the spacers 1 keep a gap between adjacent magnetic disks 5 at a predetermined distance. It should be noted that, although the spacer 1 described in the following embodiment is provided between two magnetic disks 5 while being in contact therewith, the present invention also applies to a spacer that is in contact with only the uppermost or lowermost magnetic disk 5.

As shown in FIG. 1, the spacer 1 has a ring shape and includes an outer circumferential edge surface 2, an inner circumferential edge surface 3, and main surfaces 4 that are opposite to each other. A chamfered surface (not shown) may be provided in a surface of the spacer 1, as appropriate.

The inner circumferential edge surface 3 is a surface that comes into contact with the spindle 14, and is a wall surface that surrounds a hole that has an inner diameter that is slightly larger than the outer diameter of the spindle 14.

The main surfaces 4 are two surfaces that are parallel to each other and come into contact with the magnetic disks 5. The spacer 1 fixes the magnetic disks 5 using a frictional force while being in contact with main surfaces of the magnetic disks 5.

Therefore, the surface roughness Ra (arithmetic average roughness) and the average inclination RΔa of the main surfaces 4 that come into contact with the magnetic disks 5 are determined as described below.

Here, Ra (arithmetic average roughness) and Rz (maximum height), which will be described as surface roughness parameters, conform to JIS B 0601-2001 (ISO 4287-1997). Also, the average inclination RΔa conforms to ASME B46-1995. These parameters are calculated by, for example, using data that is measured using a stylus surface roughness measurement device in which a stylus is used. For example, a stylus in which the radius of curvature of a leading end is 2 μm and the taper angle of a cone is 60° is used. Other measurement/calculation parameters are set as follows, for example: a measurement length of 400 μm, a measurement resolution (pitch: ΔX) of 0.1 μm, a scan speed of 0.1 mm/sec, a lowpass filter cut-off value (Ls) of 2.5 μm, and a highpass filter cut-off value (Lc) of 80 μm.

Specifically, the surface roughness Ra of the main surfaces 4 of the spacer 1, which come into contact with the magnetic disks 5, is not larger than 1.0 μm. The spacer 1 is made of glass that is a fragile material, and therefore, if the above-described surface roughness Ra is larger than 1.0 μm, when the spacer 1 comes into contact with a magnetic disk 5, foreign matter, such as minute particles, is generated by the spacer 1 as a result of tips of protrusions that constitute surface irregularities of the main surfaces 4 being broken, for example, and as a result, long-term reliability of the HDD apparatus is impaired. Therefore, the above-described surface roughness Ra is not larger than 1.0 μm. Further, the average inclination RΔa of the main surfaces 4 that is obtained using the following Equation (1) is at least 0.02.

$$R\Delta a = \frac{1}{n}\sum_{i=1}^{n}\left|\frac{dz_i}{dX}\right| \qquad (1)$$

Here, $dz_i/dX$ is expressed by the following Equation (2), ΔX represents a data interval [μm] between measurement data pieces of surface roughness, which corresponds to the measurement resolution (pitch) of 0.1 μm in the above example, $z_i$ (i is a natural number) represents the i-th measurement data piece. n represents a total number (n>6) of measurement data pieces.

$$\frac{dz_i}{dX} = \frac{1}{60 \cdot \Delta X}(z_{i+3} - 9z_{i+2} + 45z_{i+1} - 45z_{i-1} + 9z_{i-2} - z_{i-3}) \qquad (2)$$

Equation (2) is an equation that is used in a Savitzky-Golay filter. It should be noted that, if i in $dz_i/dX$ is 1, 2, 3, (n−2), (n−1), or n, $z_{-2}$, $z_{-1}$, $z_0$, $z_{n+1}$, $z_{n+2}$, and $z_{n+3}$ appear on the right-hand side of Equation (2), but these are not included in the total number of n measurement data pieces. In this case, auxiliary measurement data pieces that correspond to $z_{-2}$, $z_{-1}$, $z_0$, $z_{n+1}$, $z_{n+2}$, and $z_{n+3}$ are used from auxiliary measurement data pieces that have been measured for an auxiliary purpose in ranges that are adjacent to the measurement range, before or after measurement is performed to obtain the n measurement data pieces.

If the surface roughness Ra is set to be not larger than 1.0 μm as described above, the spacer 1 has small irregularities, and accordingly the number of generated minute particles is reduced. Also, it can be expected that the surfaces of the magnetic disks 5 are unlikely to be damaged by the irregularities formed in the main surfaces 4 of the spacer 1. From the same standpoint, the surface roughness Ra is preferably not larger than 0.7 μm, and more preferably not larger than 0.5 μm.

On the other hand, as the surface roughness Ra of the main surfaces 4 of the spacer 1 is reduced, an adhesive force between the spacer 1 and the magnetic disks 5 increases. If the adhesive force is too strong, it may be difficult to separate the spacer 1 and the magnetic disks 5, which adhere to each other, from each other when removing the magnetic disks 5 and the spacer 1 from the HDD apparatus.

As described above, an inspection such as a performance test is performed on HDD apparatuses after installation. If a problem is found in an HDD apparatus in a performance test or the like, the stacked magnetic disks 5 and spacers 1 are sequentially removed from the spindle 14 to remove a faulty magnetic disk 5. At this time, if a magnetic disk 5 and a spacer 1 are adhered to each other, the spacer 1 may be unseparable from the magnetic disk 5, or foreign matter may be generated when the spacer 1 is separated and minute particles of the foreign matter may attach to the surface of the magnetic disk 5. Such minute particles impair long-term reliability of the HDD apparatus.

Therefore, in order to suppress adhesion between the magnetic disk 5 and the spacer 1, the average inclination RΔa is set to be at least 0.02 in the present embodiment while the surface roughness Ra is set to be not larger than 1.0 μm. From the same standpoint, the average inclination RΔa is preferably at least 0.05, and more preferably at least 0.10. Although it is not always necessary to set the upper limit of the average inclination RΔa, the upper limit may be set to 0.3, for example. If the average inclination RΔa is larger than 0.3, there is a risk that the surface of the magnetic disk 5 will be damaged.

If the magnetic disk 5 and the spacer 1 adhere to each other, the magnetic disk 5 and the spacer 1 are separated from each other using a strong force, and therefore a portion of the surface of the magnetic disk 5 may be detached as minute particles. Such minute particles are not preferable because they cause impairment of long-term reliability of the HDD apparatus when attached to magnetic disks. If the surface roughness Ra is not larger than 1.0 μm and the average inclination RΔa is at least 0.02, adhesion between the magnetic disk 5 and the spacer 1 can be suppressed, and accordingly the number of generated minute particles can also be reduced.

Figure 4A:
FIG. 4A is a diagram schematically showing one example of an uneven shape of main surfaces of a spacer according to one embodiment.
Figure 4B:
FIG. 4B is a diagram schematically showing one example of an uneven shape of main surfaces of a conventional spacer.

Even if the surface roughness Ra of the main surfaces 4 is the same, the surfaces can have various uneven shapes. FIG. 4A is a diagram schematically showing one example of an uneven shape of the main surfaces of the spacer according to one embodiment, and FIG. 4B is a diagram schematically showing one example of an uneven shape of main surfaces of a conventional spacer. Even if the surface roughness Ra is the same, the average inclination RΔa is different between a case in which the cycle of protrusions and depressions is short and a case which the cycle of protrusions and depressions is long, as shown in FIGS. 4A and 4B. The average inclination RΔa of an uneven shape in which the cycle of protrusions and depressions is short is larger than the average inclination RΔa of an uneven shape in which the cycle of protrusions and depressions is long. The main surfaces 4 have protrusions and depressions that have a short cycle, and therefore the magnetic disk 5 and the spacer 1 are unlikely to adhere to each other.

It should be noted that, in the above-described Equation (2) for defining the average inclination RΔa, ΔX is preferably 0.05 to 0.2 μm, preferably 0.08 to 0.12 μm, and particularly preferably 0.1 μm. It is preferable that ΔX is in the above-described range and the average inclination RΔa is at least 0.02.

According to one embodiment, it is preferable that the surface roughness Ra of the spacer 1 is at least 0.01 μm. If the surface roughness Ra is smaller than 0.01 μm, the magnetic disk 5 is unlikely to be damaged, but there is a risk that, when the spindle 14 is rotated, surfaces of the magnetic disk 5 and the spacer 1 that are in contact with each other will slide against each other and be displaced relative to each other. This is due to the influence of a lubricant that is provided on the surface of the magnetic disk 5. The lubricant is a liquid, and therefore moves to fill a space between the surfaces in contact with each other, and has a function of facilitating sliding in a direction that is parallel to the main surfaces of the spacer 1 or the magnetic disk 5 and increasing the adhesive force in a direction in which the magnetic disk 5 and the spacer 1 are separated from each other (i.e., a direction perpendicular to the main surfaces 4). In particular, a film of the lubricant with a thickness of about 1 nm is normally formed on the surface of the magnetic disk 5, and if this lubricant film is attached to the surface of the spacer 1 and fills portions of grooves that constitute the uneven shape of the main surface 4 of the spacer 1, there is a risk that the spacer 1 or the magnetic disk 5 will be more likely to slide against the other in the direction parallel to the main surfaces of the spacer 1 or the magnetic disk 5, and the adhesive force between the spacer 1 and the magnetic disk 5 will be further increased in the direction perpendicular to the main surfaces 4. This phenomenon is considered as being caused by the influence of a meniscus force of the lubricant, and is more likely to occur if the thickness of the lubricant film is increased.

In view of the above, the adhesive force between the magnetic disk 5 and the spacer 1 can be reduced by setting the surface roughness Ra to be at least 0.01 μm and not larger than 1.0 μm and setting the average inclination RΔa to be at least 0.02. In order to more reliably reduce the adhesive force between the magnetic disk 5 and the spacer 1, the surface roughness Ra is preferably at least 0.05 μm, more preferably at least 0.1 μm, and yet more preferably at least 0.3 μm.

According to one embodiment, it is preferable that a metal film is formed at least on the main surfaces 4 of the spacer 1 that come into contact with the magnetic disks 5. Specifically, the spacer 1, which is made of glass, is an insulator, and therefore static electricity is likely to accumulate in the magnetic disks 5 and the spacer 1. This is not preferable because, if the magnetic disks 5 and the spacer 1 are charged, foreign matter or minute particles are likely to be adsorbed, and a recording element or a reproducing element of a magnetic head may break as a result of the accumulated static electricity being discharged to the magnetic head. Therefore, it is preferable to form a metal film, which is a conductive film, on the surface of the spacer 1 to make the spacer 1 electrically conductive, in order to eliminate static electricity. The metal film is formed using an immersion method that is used for plating, such as electroless plating, a vapor-deposition method, a sputtering method, or the like. The metal film may contain chromium, titanium, tantalum, tungsten, an alloy that contains any of these metals, or a nickel alloy, such as nickel phosphorus (NiP) or nickel tungsten (NiW), for example. It is preferable that the nickel alloy is nonmagnetic.

According to one embodiment, it is also preferable that the above-described metal film is also formed on the outer circumferential edge surface 2 and the inner circumferential edge surface 3, in addition to the main surfaces 4. If the metal film is formed on each of the upper and lower main surfaces 4 of the spacer 1, which come into contact with the magnetic disks 5, it is sufficient to form the metal film on at least one of the outer circumferential edge surface 2 and the inner circumferential edge surface 3 in order to electrically connect the metal films formed on the upper and lower main surfaces 4 to each other, and a configuration is possible in which the metal film is formed only on the inner circumferential edge surface 3, for example. In this case, electrical conductivity is further increased, and the ability to eliminate static electricity is increased. For the above-described reason, it is most preferable to form the metal film on all surfaces of the spacer 1. The thickness of the metal film is only required to be thick enough to achieve electrical conductivity with which the above-described static electricity can be released to the outside, and is 0.01 to 10 μm, for example. Even if such a metal film is formed on the main surfaces 4, the numerical ranges of the surface roughness Ra and the average inclination RΔa of the main surfaces 4 are the above-described ranges.

It should be noted that, if the spacer 1 is made of conductive glass, static electricity can be released from the magnetic disks 5 to the outside directly via the spacer 1, and therefore a configuration is also possible in which the metal film is not provided.

The above-described spacer 1 is preferably used in an HDD apparatus in which eight or more magnetic disks 5 are installed. If eight or more magnetic disks 5, which is more than six magnetic disks 5 that are normally installed in an HDD apparatus, are installed in an HDD apparatus, the magnetic disks 5 and the spacers 1 need to be more strongly pressed (clamped) against each other using the top clamp 16, and therefore the pressure applied by the top clamp 16 needs to be increased. As a result, the adhesive force between the spacers 1 and the magnetic disks 5 installed in the HDD apparatus is increased, and removal failures are likely to increase when separating the spacers 1 from the magnetic disks 5. However, as a result of the surface roughness Ra and the average inclination RΔa of the spacers 1 being limited to the above-described numerical ranges, even if the pressure is increased, the spacers 1 and the magnetic disks 5 are unlikely to adhere to each other and can be easily separated from each other. Spacers 1 that can suppress the occurrence of removal failures as described above are preferable. For the same reason, the spacer 1 of this embodiment is more preferably used in an HDD apparatus in which nine or more magnetic disks 5 are installed, and further preferably used in an HDD apparatus in which ten or more magnetic disks 5 are installed.

It is preferable that the magnetic disk 5 is obtained by forming a magnetic film on an aluminum alloy substrate or a glass substrate. If the surface roughness Ra of the magnetic disk 5 is not larger than 0.3 nm, the magnetic disk 5 is likely to adhere to the spacer 1, and if the surface roughness Ra of the magnetic disk 5 is not larger than 0.2 nm, adhesion between the magnetic disk 5 and the spacer 1 is particularly likely to occur. However, the spacer 1 of this embodiment has an excellent effect of suppressing adhesion, and therefore adhesion can be favorably suppressed even if the surface roughness of the magnetic disk 5 is in any of the above ranges. That is, the spacer 1 is preferably used together with a magnetic disk 5 that has a surface roughness Ra of not larger than 0.3 nm, and particularly preferably used together with a magnetic disk 5 that has a surface roughness Ra of not larger than 0.2 nm.

According to one embodiment, it is preferable that the surface roughness Rz (maximum height) of the outer circumferential edge surface 2 of the spacer 1 is 1.5 to 20 μm. In a case in which the spacer 1 is removed by gripping the outer circumferential edge surface 2 of the spacer 1 in a reworking operation for removing a faulty magnetic disk from the HDD apparatus after installation, if the surface roughness Rz (maximum height) is smaller than 1.5 μm, the spacer 1 may slip out of a gripping jig that grips the outer circumferential edge surface 2 of the spacer 1. If the surface roughness Rz (maximum height) is larger than 20 μm, a surface of the gripping jig may be scraped by the spacer 1 and minute foreign matter may be generated.

The material of the spacer 1 is not specifically limited, and examples of the material include aluminosilicate glass, soda-lime glass, soda aluminosilicate glass, alumino-borosilicate glass, borosilicate glass, quartz glass, and crystallized glass. An example of aluminosilicate glass that can be used contains 59 to 63 mass % of silicon dioxide ($SiO_2$), 5 to 16 mass % of aluminum oxide ($Al_2O_3$), 2 to 10 mass % of lithium oxide ($Li_2O$), 2 to 12 mass % of sodium oxide ($Na_2O$), and 0 to 5 mass % of zirconium oxide ($ZrO_2$). This glass is preferable for the spacer 1 in terms of its high rigidity and low coefficient of thermal expansion. An example of soda-lime glass that can be used contains 65 to 75 mass % of $SiO_2$, 1 to 6 mass % of $Al_2O_3$, 2 to 7 mass % of CaO, 5 to 17 mass % of $Na_2O$, and 0 to 5 mass % of $ZrO_2$. This glass is relatively soft and easy to grind and polish, and is therefore suitable for the spacer 1 in terms of facilitating an increase in surface smoothness.

The glass spacer 1 is preferably used in combination with a magnetic disk 5 that is obtained by forming a magnetic film on a glass substrate. In this case, the spacer 1 and the magnetic disk 5 have substantially the same thermal expansion rate, and even if the internal temperature of the HDD apparatus changes, the spacer 1 and the magnetic disk 5 are hardly displaced or rubbed against each other as a result of a positional change occurring between the spacer 1 and the magnetic disk 5 due to a difference in the amount of thermal expansion, and therefore the occurrence of an error in reading a recorded signal, which would be caused by displacement, and generation of minute particles, which would be caused by rubbing, can be suppressed.

A blank for the glass spacer 1 can be obtained using any method, such as a method of manufacturing a glass plate using a float method, a down draw method, or the like and cutting the glass plate into a ring shape, a method of molding molten glass through pressing, or a method of manufacturing a glass tube through tube drawing and slicing the glass tube to a suitable length. The outer circumferential edge surface 2, the inner circumferential edge surface 3, and the main surfaces 4 of the thus formed ring-shaped glass plate are subjected to chamfering or other shape processing, grinding, polishing, etching, or the like, as necessary. The main surfaces 4 can be ground through, for example, lapping that is performed using loose abrasive particles, or a planetary gear method that is performed using fixed abrasive diamond particles (diamond pads) or the like. The main surfaces 4 can be polished through, for example, a planetary gear method that is performed using a polishing solution that contains minute particles of cerium oxide or silicon dioxide.

If abrasive diamond particles or the like are used as fixed abrasive particles in polishing the main surfaces 4, one particle may be used as a fixed abrasive particle, or an aggregate that is formed by bonding a plurality of particles through vitrification or the like may be used as a fixed abrasive particle. In particular, fixed abrasive particles that contain diamond cut glass sharply, and are therefore preferable in terms of increasing the average inclination RΔa of the surface shape. Fixed abrasive particles are dispersed and are fixed in resin, for example.

Fixed abrasive particles preferably have an average particle diameter (D50) of 5 to 100 μm. If an aggregate formed by bonding a plurality of particles through vitrification or the like is used as one fixed abrasive particle, the average particle diameter (D50) of the particles is preferably 0.5 to 15 μm, and the average particle diameter (D50) of aggregates is preferably 5 to 100 μm. The average particle diameter (D50) is a particle diameter at which a cumulative curve reaches 50% when the cumulative curve is determined by setting the total volume of powder particles in the particle size distribution measured using a light scattering method to 100%.

The above-described grinding or polishing of the main surfaces 4 can be performed using a double-side grinding apparatus (or polishing apparatus) that includes upper and lower surface plates and is capable of simultaneously grinding (or polishing) two main surfaces of a workpiece through a planetary gear movement.

The surface roughness Ra and the average inclination RΔa can be adjusted by, for example, adjusting the size of loose abrasive particles or fixed abrasive particles, the pressure applied by the upper and lower surface plates (i.e., a load applied to the workpiece), the manner of changing pressure (for example, changing the pressure in a plurality of stages), the processing time of grinding or polishing, or the like. For example, if the main surfaces are ground using diamond pads, the surface roughness Ra and/or the average inclination RΔa can be increased by increasing the size of fixed abrasive particles. Here, if aggregates are used as fixed abrasive particles, tendencies vary according to the size of the particles that are included in the aggregates, in addition to the size of the aggregates, and accordingly the surface roughness Ra and/or the average inclination RΔa can be adjusted as appropriate. Further, the surface roughness Ra and/or the average inclination RΔa can be increased by increasing the pressure applied by the upper and lower surface plates.

After the above-described processing, chemical polishing (etching) may also be performed using an etching solution that contains hydrofluoric acid or silicofluoric acid. The surface roughness Ra and/or the average inclination RΔa can be changed by adjusting components of the etching solution, the concentration of the etching solution, the processing time, or the like. After grinding and/or etching, polishing may be further performed. The surface roughness Ra and/or the average inclination RΔa can be reduced through polishing. Etching may be performed after polishing. The main surfaces 4 that have a desired surface shape can be formed by performing the above-described grinding and polishing in combination as appropriate. It is preferable to grind and/or polish the outer circumferential edge surface 2 and the inner circumferential edge surface 3 of the spacer 1, and subsequently grind and/or polish the main surfaces 4.

Although dimensions of the spacer 1 may be changed as appropriate according to the specifications of the HDD into which the spacer 1 is installed, if the spacer 1 is to be used in an HDD apparatus for a nominal size of 3.5 inches, the outer diameter (diameter of the outer circumferential edge surface 2) is 31 to 33 mm, for example, the inner diameter (diameter of the inner circumferential edge surface 3) is 25 mm, for example, and the thickness is 1 to 4 mm, for example. Chamfered surfaces may be provided by chamfering inner circumferential or outer circumferential edge portions of the main surfaces 4, as appropriate.

Experimental Examples

In order to confirm the effects of the spacer 1, spacers (Samples 1 to 30) having different surface irregularities in the main surfaces were manufactured. The manufactured spacers had an inner diameter of 25 mm, an outer diameter of 32 mm, and a thickness of 2 mm. The spacers had chamfered surfaces that had an angle of 45° and a width in a radial direction of 150 μm, and the specifications of the chamfered surfaces were common between all of the spacers. First, an outer circumferential edge portion and an inner circumferential edge portion of a ring-shaped glass blank that was cut out from a glass plate were ground using a formed grindstone to form an outer circumferential edge surface, an inner circumferential edge surface, and a chamfered surface. Next, main surfaces were ground using a planetary gear-type double-side grinding apparatus in which aggregates formed by bonding minute diamond particles through vitrification were used as fixed abrasive particles in grinding pads that were affixed to upper and lower surface plates. In order to form various surface irregularities in the main surfaces, the size of the fixed abrasive particles included in the grinding pads, the load applied by the surface plates, the grinding processing time, and the like were changed. The surface roughness Rz of the outer circumferential edge surface and the inner circumferential edge surface was fixed to 5 μm, and the surface roughness Ra and the average inclination RΔa of the main surfaces 4 were changed. It should be noted that, after the above-described grinding was performed using the grinding pads including the fixed abrasive particles, lapping of the main surfaces using loose abrasive particles, polishing, or etching was appropriately performed in combination as necessary.

Evaluation of Adhesion

As shown in FIG. 3, three magnetic disks (including main surfaces having a surface roughness Ra of 0.2 nm) and four spacers that were manufactured as described above were installed in a test apparatus, which was prepared simulating an HDD apparatus, the magnetic disks and the spacers were pressed against each other using the top clamp 16, and, after the test apparatus was left to stand for 30 minutes, the magnetic disks and the spacers were separately taken out from the apparatus. The magnetic disks that were used were obtained by forming a magnetic film or the like on a nominal 3.5-inch glass substrate for a magnetic disk having an outer diameter of 95 mm, an inner diameter of 25 mm, and a thickness of 0.635 mm, and a lubricant was applied to the outermost surfaces of the magnetic disks with a thickness of 1 nm. Specifically, whether or not adhesion (separation failure) occurred was confirmed using a vacuum suction jig including a ring-shaped suction portion that sucks approximately an entire main surface of a spacer (or sucks an inner circumferential edge-side portion of a main surface when removing a magnetic disk 5).

Evaluation of Attachment of Lubricant

In order to evaluate the possibility of adhesion between the magnetic disks and the spacers, evaluation was performed regarding attachment marks of the lubricant formed on the magnetic disks after installation of the magnetic disks and the spacers. The magnetic disks that were used were obtained by forming a magnetic film or the like on a nominal 3.5-inch glass substrate for a magnetic disk having an outer diameter of 95 mm, an inner diameter of 25 mm, and a thickness of 0.635 mm, and the lubricant was applied to the outermost surfaces of the magnetic disks with a thickness of 1 nm. Unlike the example shown in FIG. 3 in which three magnetic disks and four spacers were used, eight magnetic disks (having a surface roughness Ra of 0.2 nm) and nine spacers that were manufactured as described above were installed in a test apparatus, which was prepared simulating an HDD apparatus, the magnetic disks and the spacers were pressed against each other using the top clamp, and, after the test apparatus was left to stand for 60 minutes, the magnetic disks and the spacers were separately taken out from the apparatus (i.e., an installation and separation operation was performed). After the above-described operation, the presence or absence of attachment marks of the lubricant was checked by visually inspecting portions of the main surfaces of the magnetic disks, which were located on the inner circumferential edge surface side and were in contact with the main surfaces of the spacers, by irradiating the portions with light emitted from a converging lamp in a dark room. The lubricant is a liquid, and therefore a portion of the lubricant may be attached to recesses in the surfaces of the spacers due to the influence of a meniscus force. Attachment marks indicate that the thickness of the lubricant is not even. If the lubricant is attached, when the above-described installation and separation operation is performed two or more times, the possibility of the occurrence of adhesion increases as a result of the attached lubricant filling some of the grooves that constitute the uneven shape of the main surfaces of the spacers, and therefore attachment of the lubricant is not preferable. Attachment of the lubricant was evaluated based on the following standards.

Level 1: The number of magnetic disks having attachment marks is one or less.
Level 2: The number of magnetic disks having attachment marks is two or three.
Level 3: The number of magnetic disks having attachment marks is four or more.

TABLE 1

|  | Surface roughness Ra [μm] of spacers | Average inclination RΔa of spacers | Presence or absence of adhesion | Evaluation of attachment of lubricant |
|---|---|---|---|---|
| Sample 1 | 0.3 | 0.01 | Present | — |
| Sample 2 | 0.3 | 0.02 | Absent | Level 3 |
| Sample 3 | 0.3 | 0.04 | Absent | Level 3 |
| Sample 4 | 0.3 | 0.05 | Absent | Level 2 |
| Sample 5 | 0.3 | 0.08 | Absent | Level 2 |
| Sample 6 | 0.3 | 0.10 | Absent | Level 1 |
| Sample 7 | 0.3 | 0.12 | Absent | Level 1 |
| Sample 8 | 0.3 | 0.16 | Absent | Level 1 |
| Sample 9 | 0.3 | 0.20 | Absent | Level 1 |
| Sample 10 | 0.3 | 0.25 | Absent | Level 1 |
| Sample 11 | 0.5 | 0.01 | Present | — |
| Sample 12 | 0.5 | 0.02 | Absent | Level 3 |
| Sample 13 | 0.5 | 0.05 | Absent | Level 2 |
| Sample 14 | 0.5 | 0.10 | Absent | Level 1 |
| Sample 15 | 0.5 | 0.20 | Absent | Level 1 |
| Sample 16 | 0.5 | 0.25 | Absent | Level 1 |
| Sample 17 | 0.1 | 0.01 | Present | — |
| Sample 18 | 0.1 | 0.02 | Absent | Level 3 |
| Sample 19 | 0.1 | 0.05 | Absent | Level 2 |
| Sample 20 | 0.1 | 0.10 | Absent | Level 1 |
| Sample 21 | 0.1 | 0.20 | Absent | Level 1 |
| Sample 22 | 0.7 | 0.01 | Present | — |
| Sample 23 | 0.7 | 0.02 | Absent | Level 3 |
| Sample 24 | 0.7 | 0.05 | Absent | Level 2 |
| Sample 25 | 0.7 | 0.10 | Absent | Level 1 |
| Sample 26 | 0.7 | 0.20 | Absent | Level 1 |
| Sample 27 | 0.7 | 0.25 | Absent | Level 1 |
| Sample 28 | 1.0 | 0.10 | Absent | Level 1 |
| Sample 29 | 1.0 | 0.20 | Absent | Level 1 |
| Sample 30 | 1.0 | 0.30 | Absent | Level 1 |

Samples 1 to 30 in the above Table 1 show that, if the surface roughness Ra of the main surfaces is not larger than 1.0 μm and the average inclination RΔa of the main surfaces is at least 0.02, an adhesive force is reduced and adhesion is suppressed.

Further, the evaluation results regarding attachment of the lubricant show that, if the average inclination RΔa is at least 0.05, attachment of the lubricant is suppressed, and if the average inclination RΔa is at least 0.10, attachment of the lubricant is further suppressed. Therefore, if the average inclination RΔa is at least 0.05, or at least 0.10, adhesion is unlikely to occur even if the operation for installing and separating the magnetic disks and the spacers is performed two or more times.

It should be noted that a metal film with a constant thickness of 1 μm, specifically, a metal film made of a Ni—P alloy (P: 10 mass %, Ni: the remaining portion) was formed on the outer circumferential edge surface 2, the inner circumferential edge surface 3, and the main surfaces 4 of the spacers 1 of Sample 7 through electroless plating. The spacers 1 provided with the metal film were installed in the HDD apparatus 10 shown in FIG. 3. At this time, electrical conduction between the spindle 14 and all of the magnetic disks 5 and the spacers 1 was confirmed using a tester. That is, it can be said that, as a result of the metal film being formed on the spacers 1, static electricity is unlikely to accumulate in the magnetic disks 5 and the spacers 1 and an effect of suppressing adsorption of foreign matter and minute particles to the magnetic disks 5 and the spacers 1 can be achieved, for example.

The above clearly shows the effects of the present embodiment.

The above-described spacers 1 can be manufactured as follows. That is, one embodiment of the present invention is a method for manufacturing a ring-shaped spacer 1 to be arranged in contact with a magnetic disk 5 in a hard disk drive apparatus.

This manufacturing method includes grinding main surfaces of a ring-shaped glass blank, which is a blank for the spacer 1, using a planetary gear-type double-side grinding apparatus in which fixed abrasive particles that include minute diamond particles are included in grinding pads that are affixed to upper and lower surface plates.

According to one embodiment, it is preferable that fixed abrasive particles include aggregates that are formed by bonding minute diamond particles through vitrification.

Through grinding performed in this manufacturing method, it is possible to make the main surfaces of the spacer that come into contact with magnetic disks have a surface roughness Ra of not larger than 1.0 μm and an average inclination RΔa of at least 0.02.

Although the glass spacer and the hard disk drive apparatus of the present invention have been described in detail, the present invention is not limited to the above-described embodiment, working examples, and the like, and it goes without saying that various modifications and changes can be made within a scope not departing from the gist of the present invention.

What is claimed is:

1. A ring-shaped glass spacer to be arranged in contact with a magnetic disk in a hard disk drive apparatus,
wherein a surface roughness Ra of a main surface of the glass spacer that comes into contact with the magnetic disk is not larger than 1.0 μm, and an average inclination RΔa of the main surface that is obtained using the following Equation (1) is at least 0.02 and equal to or less than 0.3, $$R\Delta a = \frac{1}{n}\sum_{i=1}^{n}\left|\frac{dz_i}{dX}\right| \quad (1)$$

here, $dz_i/dX$ is expressed by the following Equation (2), $\Delta X$ represents a data interval (μm) between measurement data pieces of surface roughness, $z_i$ (i is a natural number) represents the i-th measurement data piece, and n represents a total number (n>6) of measurement data pieces $$dz_i/dX = 1/60 \cdot \Delta X(z_{i+3} - 9z_{i+2} + 45z_{i+1} - 45z_{i-1} + 9z_{i-2} - z_{i-3}) \quad (2).$$

2. The glass spacer according to claim 1,
wherein the average inclination RΔa of the main surface is at least 0.05.

3. A hard disk drive apparatus comprising:
the glass spacer according to claim 2 and the magnetic disk.

4. The hard disk drive apparatus according to claim 3,
wherein eight or more magnetic disks are installed in the hard disk drive apparatus.

5. The glass spacer according to claim 1,
wherein the average inclination RΔa of the main surface is at least 0.1.

6. The glass spacer according to claim 5,
wherein a conductive film is formed at least on the main surface of the glass spacer.

7. A hard disk drive apparatus comprising:
the glass spacer according to claim 6 and the magnetic disk.

8. The hard disk drive apparatus according to claim 7,
wherein eight or more magnetic disks are installed in the hard disk drive apparatus.

9. A hard disk drive apparatus comprising:
the glass spacer according to claim 5 and the magnetic disk.

10. The hard disk drive apparatus according to claim 9,
wherein eight or more magnetic disks are installed in the hard disk drive apparatus.

11. The glass spacer according to claim 1,
wherein a conductive film is formed at least on the main surface of the glass spacer.

12. A hard disk drive apparatus comprising:
the glass spacer according to claim 11 and the magnetic disk.

13. The hard disk drive apparatus according to claim 12,
wherein eight or more magnetic disks are installed in the hard disk drive apparatus.

14. The glass spacer according to claim 2,
wherein a conductive film is formed at least on the main surface of the glass spacer.

15. A hard disk drive apparatus comprising:
the glass spacer according to claim 14 and the magnetic disk.

16. The hard disk drive apparatus according to claim 15,
wherein eight or more magnetic disks are installed in the hard disk drive apparatus.

17. A hard disk drive apparatus comprising:
the glass spacer according to claim 1 and the magnetic disk.

18. The hard disk drive apparatus according to claim 17,
wherein eight or more magnetic disks are installed in the hard disk drive apparatus.

19. A method for manufacturing the ring-shaped glass spacer to be arranged in contact with the magnetic disk in the hard disk drive apparatus according to claim 1, the method comprising:
preparing a ring-shaped glass blank; and
grinding main surfaces of the ring-shaped glass blank by using grinding pads that include diamond particles as fixed abrasive particles.

20. The method according to claim 19, further comprising forming a conductive film on at least one of the main surfaces of the glass spacer.

* * * * *